US010009142B1

(12) United States Patent
Velusamy et al.

(10) Patent No.: US 10,009,142 B1
(45) Date of Patent: Jun. 26, 2018

(54) CONTROL OVER MODULATION AND CODING SCHEMES USED BY WIRELESS RELAY USER EQUIPMENT

(71) Applicant: Sprint Communications Company L.P., Overland Park, KS (US)

(72) Inventors: Saravana Velusamy, Olathe, KS (US); Sreekar Marupaduga, Overland Park, KS (US); Vanil Parihar, Overland Park, KS (US); Nitesh Manchanda, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 88 days.

(21) Appl. No.: 15/244,204

(22) Filed: Aug. 23, 2016

(51) Int. Cl.
*H04B 7/14* (2006.01)
*H04W 52/00* (2009.01)
*H04L 1/00* (2006.01)
*H04B 7/155* (2006.01)
*H04W 52/26* (2009.01)

(52) U.S. Cl.
CPC ....... *H04L 1/0003* (2013.01); *H04B 7/15507* (2013.01); *H04W 52/262* (2013.01)

(58) Field of Classification Search
None
See application file for complete search history.

(56) References Cited

U.S. PATENT DOCUMENTS

| | | | |
|---|---|---|---|
| 8,599,790 B1 * | 12/2013 | Damle | H04W 76/022 370/331 |
| 8,724,648 B2 | 5/2014 | Zeng et al. | |
| 8,811,261 B2 | 8/2014 | Nagata et al. | |
| 8,918,692 B2 | 12/2014 | Braithwaite | |
| 9,014,073 B2 | 4/2015 | Park et al. | |
| 9,025,430 B2 | 5/2015 | Cheng et al. | |
| 9,071,322 B2 | 6/2015 | Ma et al. | |
| 9,094,814 B1 | 7/2015 | Kullman et al. | |
| 9,131,428 B2 * | 9/2015 | Wong | H04W 40/04 |
| 9,203,584 B2 | 12/2015 | Ji et al. | |
| 2008/0207117 A1 * | 8/2008 | Lim | H04B 7/15557 455/9 |
| 2010/0110964 A1 | 5/2010 | Love et al. | |

(Continued)

FOREIGN PATENT DOCUMENTS

WO 2015164251 10/2015

*Primary Examiner* — Candal Elpenord

(57) ABSTRACT

A wireless communication network selects Modulation and Coding Schemes (MCS) for wireless relays. A wireless network controller determines the amount of wireless access Access Point Names (APNs) that are served by a User Equipment (UE) in the wireless relay. The network controller selects an MCS for the UE in the wireless relay based on the amount of the wireless access APNs served by the UE. The network controller directs a wireless base station and the UE in the wireless relay to use the selected MCS. The UE in the wireless relay exchanges user data with the multiple wireless access points that serve other UEs. The UE in the wireless relay exchanges the user data with the wireless base station using the selected MCS. The network controller may comprise a Long Term Evolution (LTE) Mobility Management Entity (MME), and the wireless access points may comprise LTE eNodeBs.

20 Claims, 8 Drawing Sheets

(56) References Cited

U.S. PATENT DOCUMENTS

| | | | |
|---|---|---|---|
| 2011/0075675 A1* | 3/2011 | Koodli | H04L 12/14 370/401 |
| 2012/0135677 A1* | 5/2012 | Hsu | H04B 7/15507 455/11.1 |
| 2012/0276896 A1 | 11/2012 | Ren et al. | |
| 2012/0300693 A1 | 11/2012 | Takahashi et al. | |
| 2013/0016649 A1* | 1/2013 | Damnjanovic | H04W 88/04 370/315 |
| 2013/0095748 A1 | 4/2013 | Hu et al. | |
| 2013/0336200 A1* | 12/2013 | Andreozzi | H04W 40/22 370/315 |
| 2015/0036590 A1 | 2/2015 | Lahetkangas et al. | |
| 2015/0163021 A1 | 6/2015 | Braithwaite | |
| 2015/0215902 A1* | 7/2015 | Suga | H04W 72/04 455/450 |
| 2016/0066336 A1* | 3/2016 | Sevindik | H04W 72/10 370/315 |
| 2017/0033858 A1* | 2/2017 | Calcev | H04B 7/14 |

* cited by examiner

CONTROL OVER MODULATION AND CODING SCHEMES USED BY WIRELESS RELAY USER EQUIPMENT

TECHNICAL BACKGROUND

Data communication systems exchange user data with User Equipment (UE) to provide various data communication services. The UE may be a phone, computer, media player, and the like. The data communication services may be Internet access, voice calling, video conferencing, or some other computerized information service. A popular wireless communication technology is Long Term Evolution (LTE). LTE networks use wireless base stations called evolved Node Bs (eNodeBs) to wirelessly connect UEs to LTE networks.

The LTE networks comprise other network elements like Mobility Management Entities (MMEs), Home Subscriber Systems (HSS), gateways, routers, and servers. The MMEs orchestrate session control over the LTE network to deliver multiple data services to the UE. The UE then exchanges user data with the gateways systems over the eNodeB to deliver the data services.

Wireless relays extend the range of the eNodeBs in LTE networks. A wireless relay has an UE that communicates with another eNodeB. The wireless relay also has multiple Wireless Access Points (WAPs) that interface with UEs. In some deployments, multiple wireless relays are coupled together to form chains and trees. The eNodeBs and the UEs in the wireless relays use Modulation and Coding Schemes (MCS) to wirelessly communicate over the air. The eNodeB typically selects the MCS for the UE in the wireless relay based on current signal strength and/or quality.

As the wireless relay chains and trees reach levels of complexity, the ability to manage MCS by signal strength and quality has limitations. Unfortunately, MMEs and eNodeBs are not efficient and not effective when controlling MCS in a multi-relay environment.

TECHNICAL OVERVIEW

A wireless communication network selects Modulation and Coding Schemes (MCS) for wireless relays. A wireless network controller determines the amount of wireless access Access Point Names (APNs) that are served by User Equipment (UE) in the wireless relay. The network controller selects an MCS for the UE in the wireless relay based on the amount of the wireless access APNs served by the UE. The network controller directs a wireless base station and the UE in the wireless relay to use the selected MCS. The UE in the wireless relay exchanges user data with the multiple wireless access points that serve other UEs. The UE in the wireless relay exchanges the user data with the wireless base station using the selected MCS. The network controller may comprise a Long Term Evolution (LTE) Mobility Management Entity (MME), and the wireless access points may comprise LTE eNodeBs.

DETAILED DESCRIPTION

Figure 1:
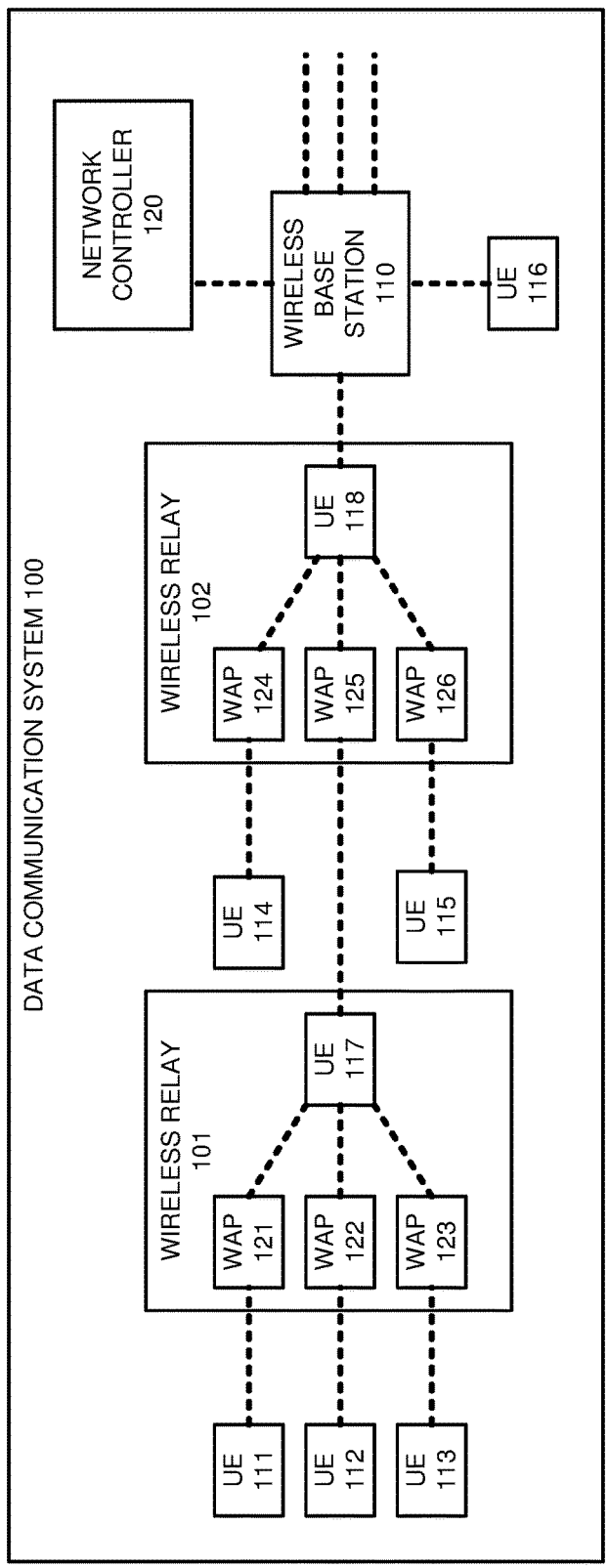
FIGS. 1-2 illustrate a data communication system to control Modulation and Coding Schemes (MCS) that are used by User Equipment (UEs) in wireless relays.
Figure 2:
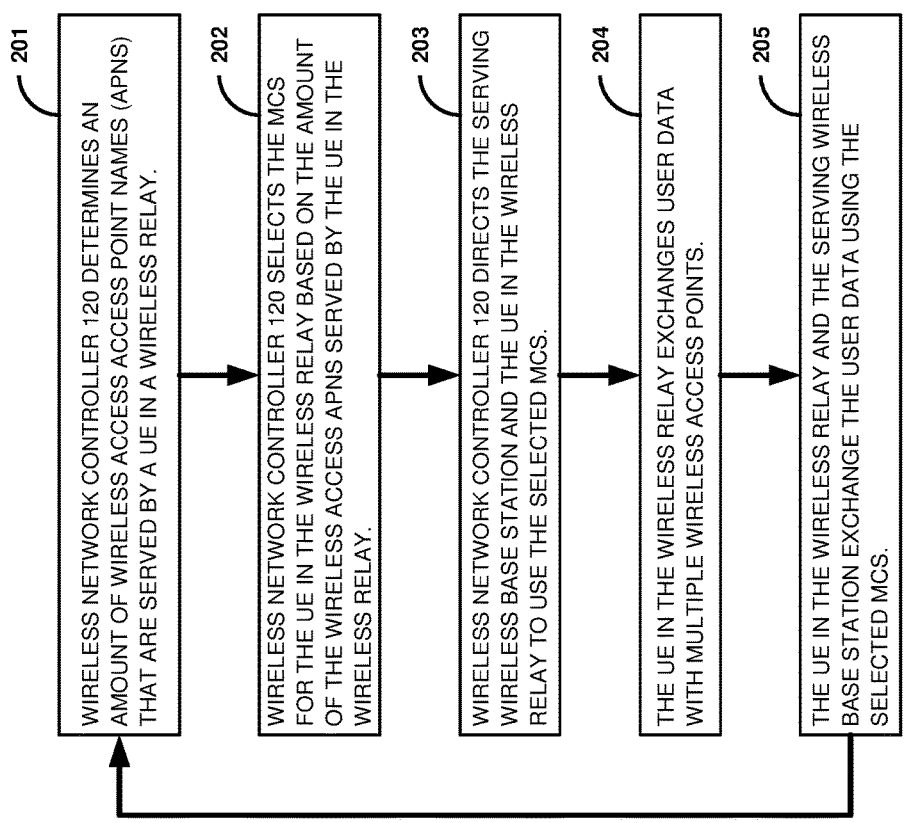
Figure 3:
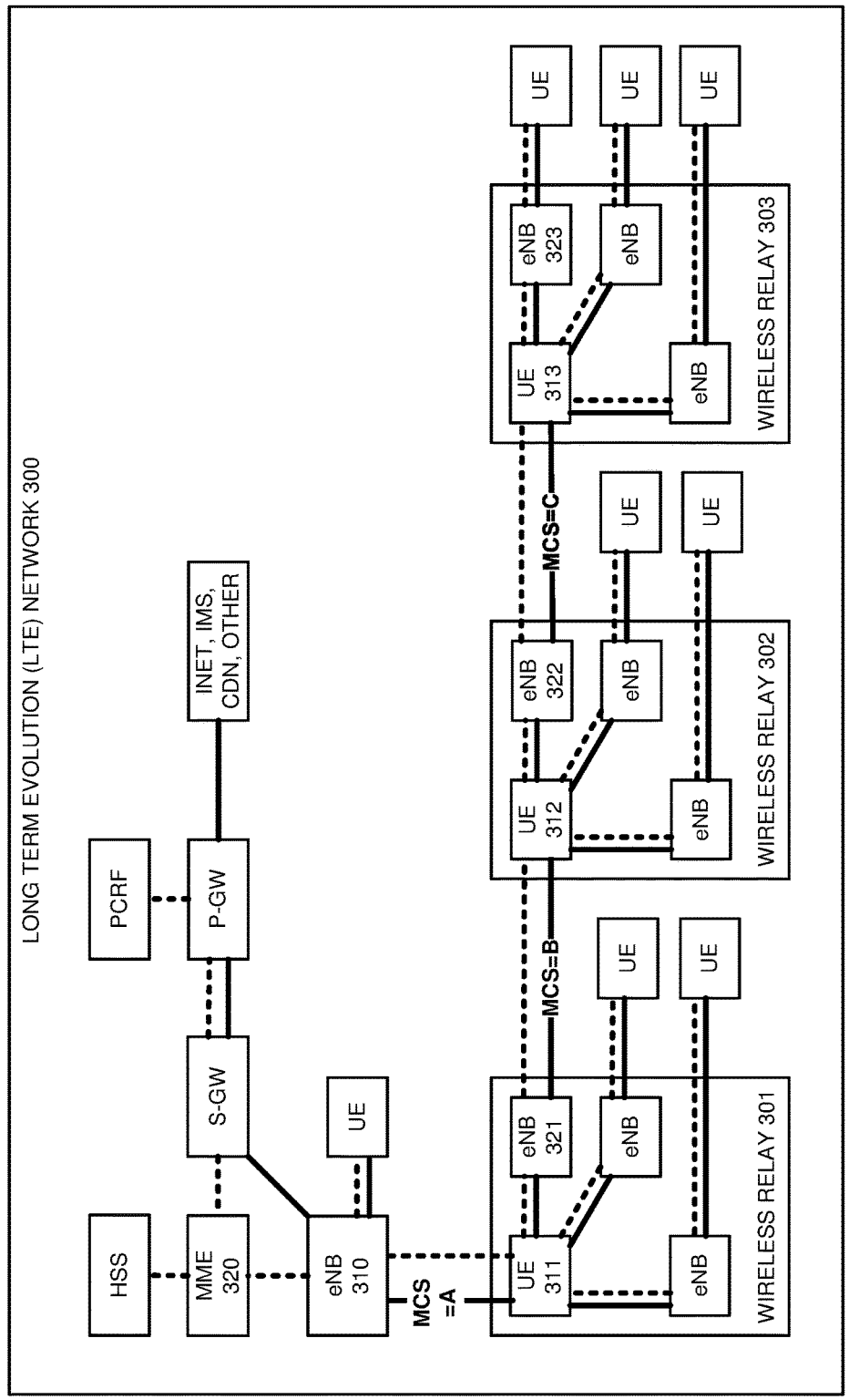
FIGS. 3-6 illustrate a Long Term Evolution (LTE) network to control the MCS that is used by UEs in wireless relays.

FIGS. 1-2 illustrate data communication system 100 to control Modulation and Coding Schemes (MCS) that are used by User Equipment (UE) in wireless relays. Data communication system 100 comprises: wireless relays 101-102, wireless base station 110, UEs 111-116, and network controller 120. Wireless relay 101 comprises UE 117 and Wireless Access Points (WAPs) 121-123. Wireless relay 102 comprises UE 118 and WAPs 124-126.

UEs 111-116 comprise computers, phones, media players, or some other intelligent machines with wireless communication transceivers. Wireless base station 110 comprises computer equipment with one or more wireless communication interfaces, such as a Long Term Evolution (LTE) evolved Node B (eNodeB), 5G base station, Wireless Fidelity (WIFI) hotspot, or LTE/WIFI Aggregation (LWA) node. Network controller 120 comprises data processing circuitry, data memory, data communication transceivers, and operating software. Network controller 130 may be one or more Mobility Management Entities (MMEs), Home Subscriber Systems (HSSs), and/or some other control databases. In wireless relays 101-102, UEs 117-118 comprise computers with wireless communication transceivers. WAPs 121-126 also comprise computers with wireless communication transceivers. WAPs 121-126 might be eNodeBs, 5G base stations, WIFI hotspots, LWA nodes, and the like.

When UE 116 attaches to wireless base station 110, network controller 120 selects Access Point Names (APNs) for UE 116. UE 116 uses the APNs to communicate through wireless base station 110 with various service nodes that deliver wireless data services like internet access, voice calling, and video conferencing. For UE 118 in wireless relay 102, network controller 120 also selects APNs for UE 118. UE 118 uses these APNs to communicate through wireless base station 110 with various service nodes that deliver wireless data services like relay backhaul and network signaling. Thus, an individual APN is associated with a specific wireless data service like wireless voice calling for the typical user or relay backhaul for the typical relay.

In a like manner, network controller 120 selects APNs for UE 114 when UE 114 attaches to WAP 124. UE 114 uses its APNs to communicate through WAP 124, UE 118, and wireless base station 110 for wireless data services like internet access, voice calling, and video conferencing. For UE 117 in wireless relay 101, network controller 120 also selects APNs for wireless data services like relay backhaul and network signaling.

After UEs 111-118 attach, a set of downstream wireless data service APNs may be identified that are supported by UE 118 where downstream is in the direction away from wireless base station 110 and toward UEs 111-113. Note that UEs 111-116 may have differing data service plans and different APNs from one another. Also, UEs 117-118 may have differing capabilities and APNs from one another. A wireless data service APN load for a UE in a wireless relay may be measured at various levels of granularity. For example, the voice calling APNs could be separately measured or all APNs—including relay APNs—could be counted.

Network controller 120 determines an amount of wireless data APNs that are served by UE 118 in wireless relay 102.

This includes the APNs for downstream UEs 111-115 and perhaps UE 117. Some APNs may be weighted or ignored. Network controller 120 then selects an MCS for UE 118 based on the determined amount of wireless access APNs. As indicated above, MCS selection may use specific types or combinations of APNs to determine APN loading. An exemplary MCS selection comprises a Quadrature Amplitude Modulation (QAM) level. Network controller 120 then directs wireless base station 110 and UE 118 to use the selected MCS, such as QAM 128. UEs 114-115 exchange user data with WAPs 124 and 126. WAPs 124 and 126 exchange the user data with UE 118. UE 118 and wireless base station 110 exchange the user data using the selected MCS, such as QAM 128.

Network controller 120 also determines the amount of downstream wireless data APNs that are served by UE 117 in wireless relay 101. This includes the APNs for downstream UEs 111-113. Network controller 120 then selects an MCS, such as QAM 64, for UE 117 based on the determined amount of wireless access APNs. Network controller 120 directs WAP 125 and UE 117 to use the selected MCS. UEs 111-113 exchange user data with WAPs 121-123. WAPs 121-123 exchange the user data with UE 117. UE 117 and WAP 125 exchange the user data using the selected MCS, such as QAM 64.

Referring to the operational sequence of FIG. 2, wireless network controller 120 initially determines an amount of downstream Access Point Names (APNs) that are served by a UE in a wireless relay (201). The APNs are used by UEs to communicate through wireless base station 110 for data services like internet access, voice calling, and video conferencing. The determination may be performed periodically and/or in response to downstream UE attachments, service alarms, and the like. The determination may or may not include relay APNs. The determination may also focus on specific types of APNs like internet access and/or voice calling.

Network controller 120 then selects an MCS for the relay UE based on the amount of downstream wireless access APNs (202). The typical MCS selection comprises a Quadrature Amplitude Modulation (QAM) level, but other levels and types of modulation coding could be used like Quadrature Phase Shift Keying (QPSK), Millimeter Wave (mmW) modulation), or the like. Network controller 120 directs the UE and its serving wireless base station to use the selected MCS (203). The serving wireless base station may be a relay WAP or a macrocell like wireless base station 110.

Various UEs exchange user data with their serving relay WAPs. The relay WAPs exchange the user data with their relay UE. Thus, the relay UE exchanges the user data with multiple WAPs (204). The relay UE and its serving base station exchange the user data using their selected MCS (205). In a complex relay tree, different relay UEs may use different MCS based on their differing downstream APN loads that could be measured at various levels of granularity.

FIGS. 3-6 illustrate Long Term Evolution (LTE) network 300 to control the Modulation and Coding Schemes (MCS) that are used by User Equipment (UE) 311-313 in wireless relays 301-303. LTE network 300 comprises: wireless relays 301-303, eNodeB 310, and Mobility Management Entity (MME) 320. LTE network 300 further includes a Home Subscriber System (HSS), Service Gateway (S-GW), Packet Data Network Gateway (P-GW), and a Policy Charging Rules Function (PCRF).

Wireless relay 301 comprises UE 311 and eNodeBs (eNB) including eNodeB 321. Wireless relay 302 comprises UE 312 and eNodeBs including eNodeB 322. Wireless relay 303 comprises UE 313 and eNodeBs including eNodeB 323. The eNodeBs wirelessly serve various UEs. The P-GW is coupled to service systems like internet access, Internet Protocol Multimedia Subsystem (IMS), and Content Delivery Network (CDN).

When UE 311 attaches to eNodeB 310, MME 320 selects APNs for UE 311. UE 311 uses the APNs to communicate through eNodeB 310 with the gateways and service systems. When the UE attaches to eNodeB 323, MME 320 selects APNs for the UE, and the UE uses these APNs to communicate with the gateways and service systems over eNodeBs 310 and 321-323 and UEs 311-313.

After the UEs attach, MME 320 determines an amount of wireless data APNs that are served by UE 311 in wireless relay 301. MME 320 then selects MCS=A for UE 311 based on the downstream wireless access APNs. The MCS selection may use specific types of downstream APNs, like internet access APNs, voice calling APNs, and/or video conferencing APNs. MME 320 then directs eNodeB 310 and UE 311 to use selected MCS=A. UE 311 and eNodeB 310 exchange the user data using MCS=A.

MME 320 also determines an amount of wireless data APNs that are served by UE 312 in wireless relay 302. MME 320 then selects MCS=B for UE 312 based on the downstream wireless access APNs. MME 320 directs eNodeB 321 and UE 312 to use selected MCS=B. UE 312 and eNodeB 321 exchange the user data using MCS=B. Likewise, MME 320 determines an amount of wireless data APNs that are served by UE 313 in wireless relay 303. MME 320 then selects MCS=C for UE 313 based on the downstream wireless access APNs. MME 320 directs eNodeB 322 and UE 313 to use selected MCS=C. UE 313 and eNodeB 322 exchange the user data using MCS=C.

MME 320 modifies the MCS that are used between UEs 311-313 and eNodeBs 310 and 321-322 in response to wireless attachments and detachments by other downstream UEs.

Figure 4:
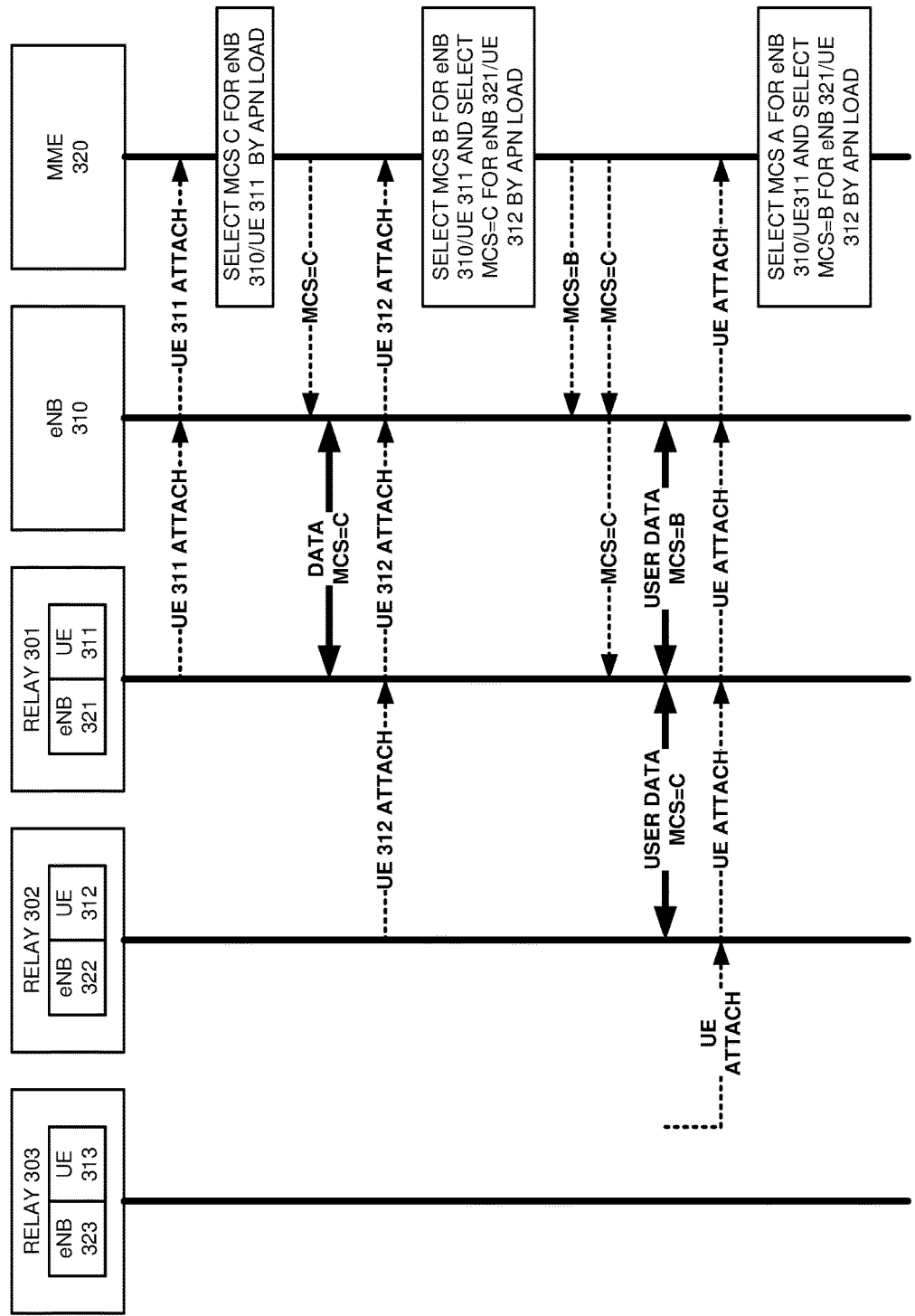

Referring to FIG. 4, a typical operational sequence is described. When UE 311 attaches to eNodeB 310, eNodeB 310 transfers an initial UE message to MME 320. MME 320 selects APNs for UE 311 using the HSS. MME 320 selects MCS=C for unloaded UE 311. MME 320 then directs eNodeB 310 and UE 311 to use MCS=C. Initially, UE 311 and eNodeB 310 exchange the user data using MCS=C.

When UE 312 attaches to eNodeB 321, eNodeB 321 transfers an initial UE message to MME 320. MME 320 selects APNs for UE 312 using the HSS. Responsive to the downstream attachment, MME 320 selects MCS=B for lightly loaded UE 311. MME 320 selects MCS=C for unloaded UE 312. MME 320 directs eNodeB 310 and UE 311 to use MCS=B, and UE 311 and eNodeB 310 exchange the user data using MCS=B. MME 320 directs eNodeB 321 and UE 312 to use MCS=C, and UE 312 and eNodeB 321 exchange the user data using MCS=C. When a UE attaches to eNodeB 322, eNodeB 322 transfers an initial UE message to MME 320. MME 320 selects APNs for the UE using the HSS. Responsive to the downstream attachment, MME 320 selects MCS=A for loaded UE 311. MME 320 selects MCS=B for lightly loaded UE 312.

Figure 5:
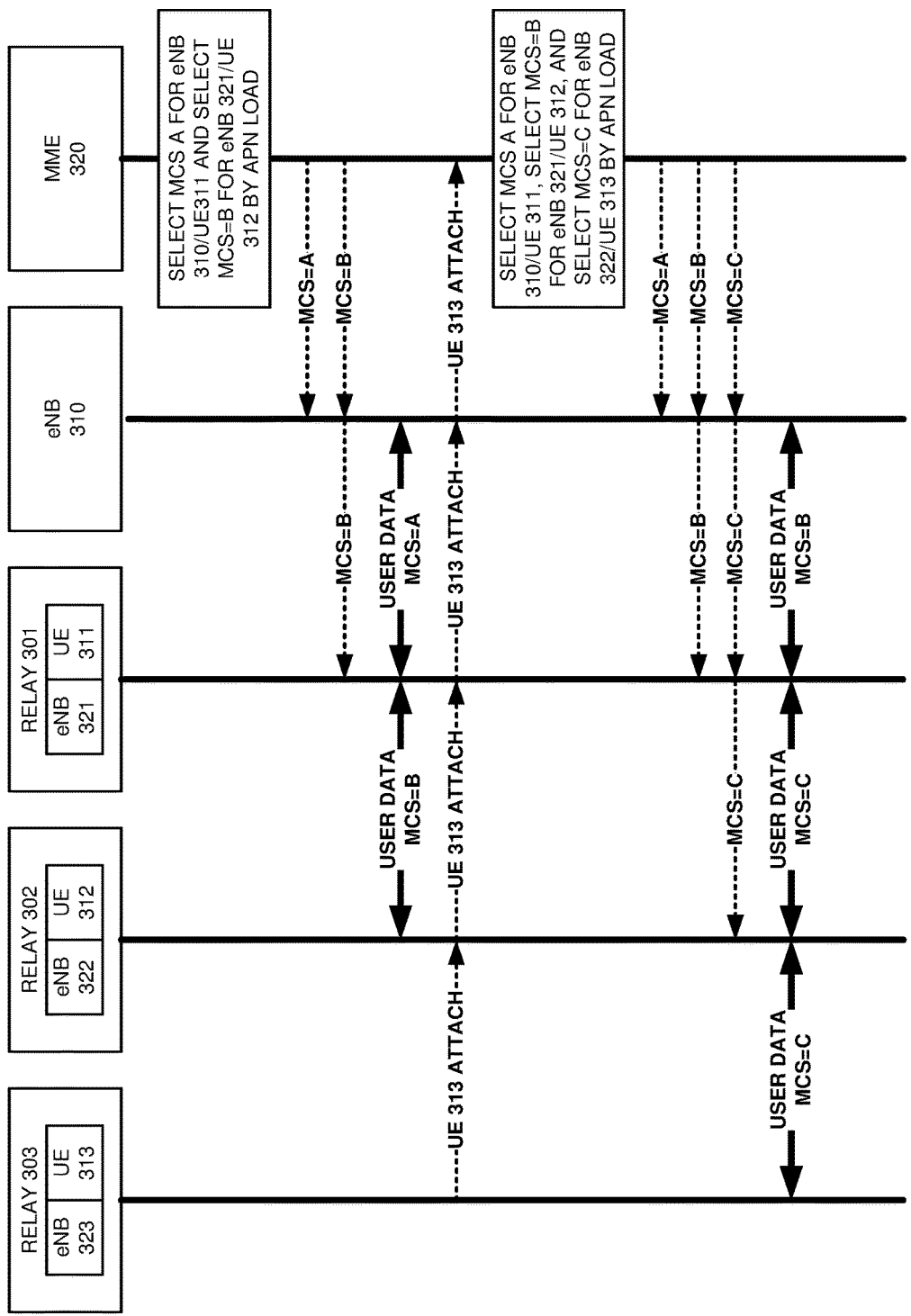

Referring to FIG. 5, MME 320 makes the selections described above and directs eNodeB 310 and UE 311 to use MCS=A. UE 311 and eNodeB 310 exchange the user data using MCS=A. MME 320 directs eNodeB 321 and UE 312 to use MCS=B, and UE 312 and eNodeB 321 exchange the user data using MCS=B. When UE 313 attaches to eNodeB 322, eNodeB 322 transfers an initial UE message to MME 320. MME 320 selects APNs for UE 313 using the HSS.

Responsive to the downstream attachment, MME 320 selects MCS=A for loaded UE 311. MME 320 selects MCS=B for lightly loaded UE 312. MME 320 selects MCS=C for unloaded UE 313. MME 320 directs eNodeB 310 and UE 311 to use MCS=A, and UE 311 and eNodeB 310 exchange the user data using MCS=A. MME 320 directs eNodeB 321 and UE 312 to use MCS=B, and UE 312 and eNodeB 321 exchange the user data using MCS=B. MME 320 directs eNodeB 322 and UE 313 to use MCS=C, and UE 313 and eNodeB 322 exchange the user data using MCS=C.

Figure 6:
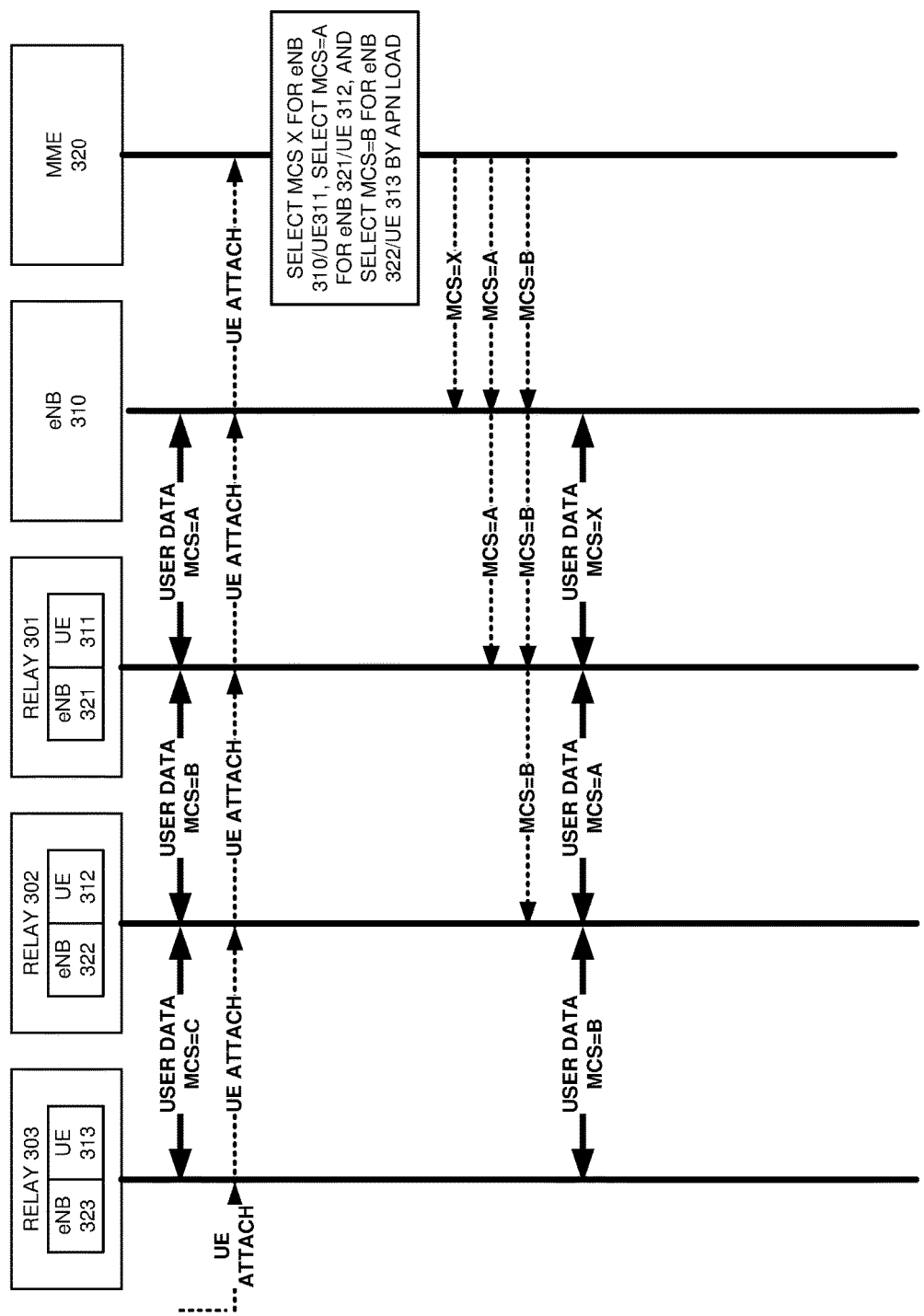

Referring to FIG. 6 and when a UE attaches to eNodeB 323, eNodeB 323 transfers an initial UE message to MME 320. MME 320 selects APNs for the UE using the HSS. Responsive to the downstream attachment, MME 320 selects MCS=X for highly loaded UE 311. MME 320 selects MCS=A for loaded UE 312. MME 320 selects MCS=B for lightly loaded UE 313. MME 320 directs eNodeB 310 and UE 311 to use MCS=X, and UE 311 and eNodeB 310 exchange the user data using MCS=X. MME 320 directs eNodeB 321 and UE 312 to use MCS=A, and UE 312 and eNodeB 321 exchange the user data using MCS=A. MME 320 directs eNodeB 322 and UE 313 to use MCS=B, and UE 313 and eNodeB 322 exchange the user data using MCS=B.

MME 320 may host or access a data structure that correlates various APN loads to the selected MCS. For example, a simple data structure may correlate downstream internet access APN load levels to QAM levels. A more complicated data structure may apply different weights to the downstream APNs and then correlate the weighted APN sums to various millimeter wave coding levels.

Figure 7:
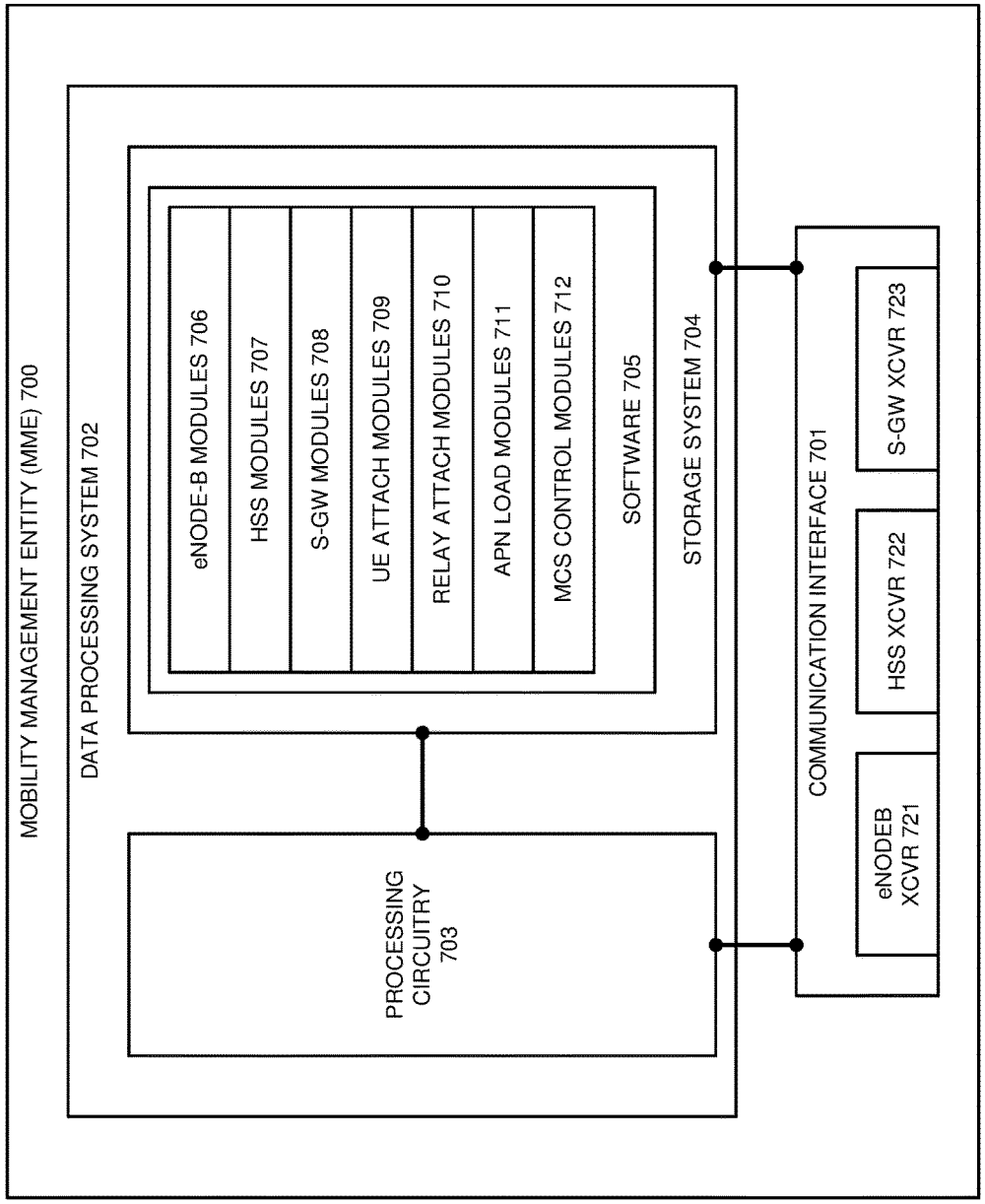
FIG. 7 illustrates a Mobility Management Entity (MME) to control the MCS that is used by UEs in wireless relays.

FIG. 7 illustrates Mobility Management Entity (MME) 700 to control the MCS used by UEs in wireless relays. MME 700 is an example of network controller 120, although controller 120 may use alternative configurations and operations. MME 700 comprises data communication interface 701 and data processing system 702. Data communication interface 701 comprises eNodeB transceiver (XCVR) 721, HSS transceiver 722, and S-GW transceiver 723. Data processing system 702 comprises processing circuitry 703 and storage system 704. Storage system 704 stores software 705. Software 705 includes respective software modules 706-712.

Transceivers 721-723 comprise communication components, such as ports, bus interfaces, signal processors, central processing units, memory, software, and the like. Processing circuitry 703 comprises server blades, circuit boards, bus interfaces, integrated circuitry, and associated electronics. Storage system 704 comprises non-transitory, machine-readable, data storage media, such as flash drives, disc drives, memory circuitry, servers, and the like. Software 705 comprises machine-readable instructions that control the operation of processing circuitry 703 when executed. Software 705 includes software modules 706-712. MME 700 may be centralized or distributed. All or portions of software 706-712 may be externally stored on one or more storage media, such as circuitry, discs, and the like. Some conventional aspects of MME 700 are omitted for clarity, such as power supplies, enclosures, and the like.

When executed by processing circuitry 703, software modules 706-712 direct circuitry 703 to perform the following operations. eNodeB modules 706 interface with eNodeBs and UEs over S1-MME and Non-Access Stratum (NAS) interfaces. HSS modules 707 interface with HSS over Diameter interfaces to obtain APNs for UEs and relays. S-GW modules 708 interface with S-GWs over S11 interfaces to establish UE sessions. UE attach modules 709 determine authorized APNs for UEs. Relay attach modules 710 determine authorized APNs for relay UEs. APN load modules 711 track downstream APNs per relay UE at various APN levels and APN weights. MCS control modules 712 select MCS levels for relay UEs and their serving wireless access point based on the downstream APN loading.

Figure 8:
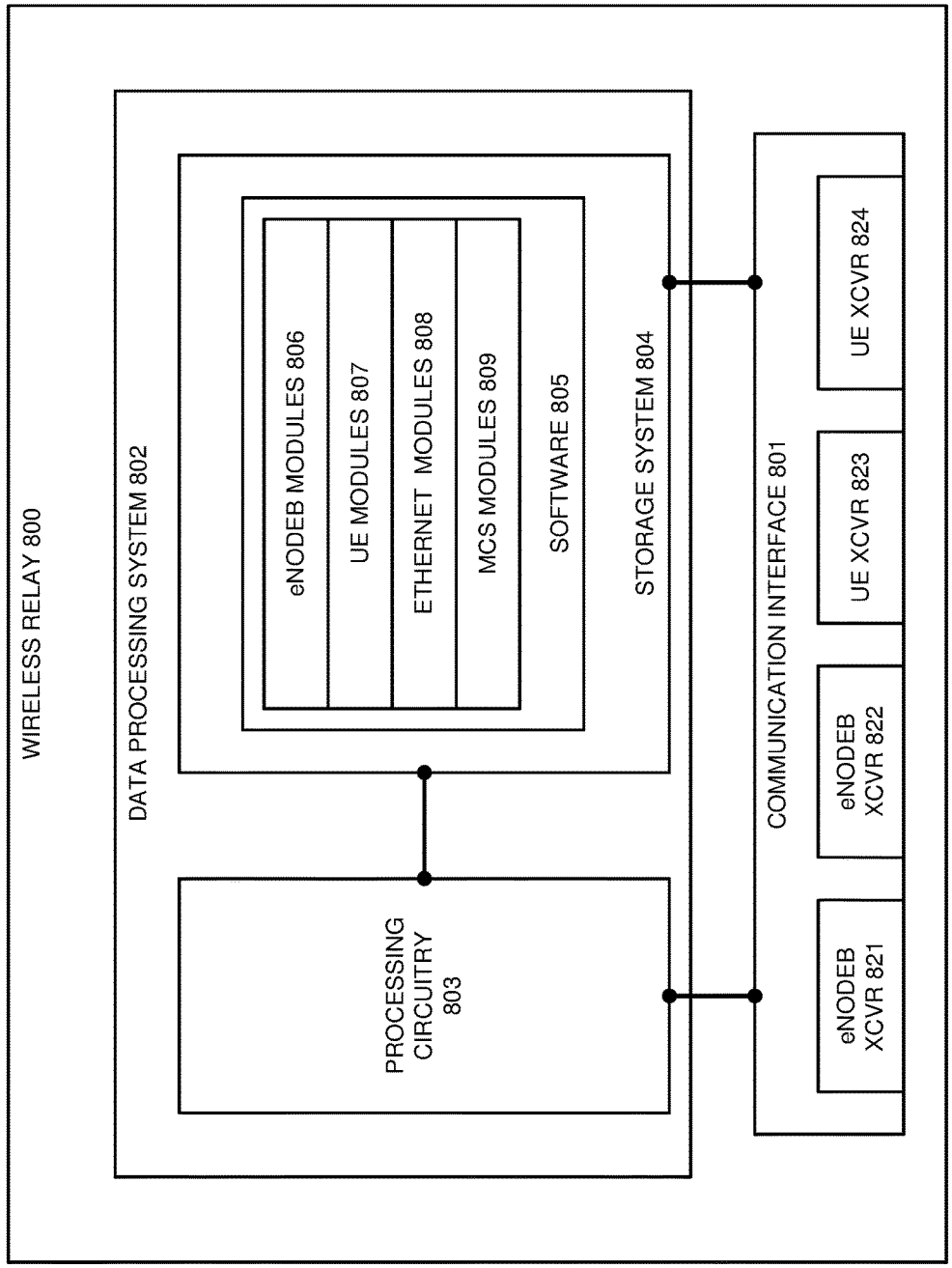
FIG. 8 illustrates a wireless relay to control the MCS that is used by the UE in the wireless relay.

FIG. 8 illustrates wireless relay 800 to use a selected MCS. Wireless relay 800 is an example of wireless relays 101-102, although relays 101-102 may use alternative configurations and operations. Wireless relay 800 comprises data communication interface 801 and data processing system 802. Data communication interface 801 comprises eNodeB transceivers 821-822 and UE transceivers 823-824. Data processing system 802 comprises processing circuitry 803 and storage system 804. Storage system 804 stores software 805. Software 805 includes respective software modules 806-809.

Transceivers 821-824 comprise communication components, such as antennas, filters, amplifiers, bus interfaces, signal processors, central processing units, memory, software, and the like. Processing circuitry 803 comprises server blades, circuit boards, bus interfaces, integrated circuitry, and associated electronics. Storage system 804 comprises non-transitory, machine-readable, data storage media, such as flash drives, disc drives, memory circuitry, servers, and the like. Software 805 comprises machine-readable instructions that control the operation of processing circuitry 803 when executed. Software 805 includes software modules 806-809. NFV server system 800 may be centralized or distributed. All or portions of software 806-809 may be externally stored on one or more storage media, such as circuitry, discs, and the like. Some conventional aspects of wireless relay 800 are omitted for clarity, such as power supplies, enclosures, and the like.

When executed by processing circuitry 803, software modules 806-809 direct circuitry 803 to perform the following operations. eNodeB modules 806 interface with eNodeBs over LTE RRC or LWA connections. UE modules 807 interface with UEs over LTE RRC or LWA connections. Ethernet modules 808 communicate between eNodeB modules 806 and UE modules 807. MCS modules 809 implement MCS instructions from MMEs or other control systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network to select a Modulation and Coding Scheme (MCS) for a wireless relay that comprises User Equipment (UE) and multiple wireless access points, the method comprising:

a wireless network controller determining an amount of data for wireless access Access Point Names (APNs) that are served by the UE in the wireless relay;

the wireless network controller selecting the MCS for the UE in the wireless relay based on the amount of the data for the wireless access APNs served by the UE in the wireless relay;

the wireless network controller directing a wireless base station and the UE in the wireless relay to use the selected MCS;

the UE in the wireless relay exchanging user data with the multiple wireless access points; and the UE in the wireless relay and the wireless base station exchanging the user data using the selected MCS.

2. The method of claim 1 wherein the wireless network controller comprises a Long Term Evolution (LTE) Mobility Management Entity (MME).

3. The method of claim 1 wherein the multiple wireless access points comprise Long Term Evolution (LTE) eNodeBs.

4. The method of claim 1 wherein the wireless base station comprises a Long Term Evolution (LTE) eNodeB.

5. The method of claim 1 wherein the wireless base station comprises a Long Term Evolution (LTE) eNodeB in another wireless relay.

6. The method of claim 1 wherein the amount of the data for the wireless access APNs served by the UE in the wireless relay includes downstream data for downstream APNs for downstream wireless relays.

7. The method of claim 1 wherein the amount of the data for the wireless access APNs served by the UE in the wireless relay does not include downstream data for downstream APNs for downstream wireless relays.

8. The method of claim 1 wherein the selected MCS comprises a Quadrature Amplitude Modulation (QAM) level.

9. The method of claim 1 wherein the wireless access APNs comprise relay voice service APNs and the user data comprises user voice data.

10. The method of claim 1 wherein the wireless access APNs comprise relay video service APNs and the user data comprises user video data.

11. A wireless communication network to select a Modulation and Coding Scheme (MCS) for a wireless relay that comprises User Equipment (UE) and multiple wireless access points, the method comprising:

a wireless network controller configured to determine an amount of data for wireless access Access Point Names (APNs) that are served by the UE in the wireless relay, select the MCS for the UE in the wireless relay based on the amount of the data for the wireless access APNs served by the UE in the wireless relay, and direct a wireless base station and the UE in the wireless relay to use the selected MCS;

the UE in the wireless relay configured to exchange user data with the multiple wireless access points and to exchange the user data with the wireless base station using the selected MCS; and the wireless base station configured to exchange the user data with the UE in the wireless relay using the selected MCS.

12. The wireless communication network of claim 11 wherein the wireless network controller comprises a Long Term Evolution (LTE) Mobility Management Entity (MME).

13. The wireless communication network of claim 11 wherein the multiple wireless access points comprise Long Term Evolution (LTE) eNodeBs.

14. The wireless communication network of claim 11 wherein the wireless base station comprises a Long Term Evolution (LTE) eNodeB.

15. The wireless communication network of claim 11 wherein the wireless base station comprises a Long Term Evolution (LTE) eNodeB in another wireless relay.

16. The wireless communication network of claim 11 wherein the amount of the data for the wireless access APNs served by the UE in the wireless relay includes downstream data for downstream APNs for downstream wireless relays.

17. The wireless communication network of claim 11 wherein the amount of the data for the wireless access APNs served by the UE in the wireless relay does not include downstream data for downstream APNs for downstream wireless relays.

18. The wireless communication network of claim 11 wherein the selected MCS comprises a Quadrature Amplitude Modulation (QAM) level.

19. The wireless communication network of claim 11 wherein the wireless access APNs comprise relay voice service APNs and the user data comprises user voice data.

20. The wireless communication network of claim 11 wherein the wireless access APNs comprise relay video service APNs and the user data comprises user video data.

* * * * *